(12) United States Patent
McNeeney et al.

(10) Patent No.: US 10,423,537 B2
(45) Date of Patent: Sep. 24, 2019

(54) ADDRESS SPACE RESIZING TABLE FOR SIMULATION OF PROCESSING OF TARGET PROGRAM CODE ON A TARGET DATA PROCESSING APPARATUS

(71) Applicant: Arm Limited, Cambridge (GB)

(72) Inventors: Adam James McNeeney, Histon (GB); Matthew Lucien Evans, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/884,526

(22) Filed: Jan. 31, 2018

(65) Prior Publication Data

US 2019/0236019 A1 Aug. 1, 2019

(51) Int. Cl.
*G06F 12/10* (2016.01)
*G06F 12/1009* (2016.01)
*G06F 9/455* (2018.01)
*G06F 12/1036* (2016.01)
*G06F 12/02* (2006.01)

(52) U.S. Cl.
CPC ...... *G06F 12/1009* (2013.01); *G06F 9/45558* (2013.01); *G06F 12/0215* (2013.01); *G06F 12/1036* (2013.01); *G06F 2212/652* (2013.01); *G06F 2212/654* (2013.01); *G06F 2212/68* (2013.01)

(58) Field of Classification Search
None
See application file for complete search history.

(56) References Cited

U.S. PATENT DOCUMENTS

| | | | | |
|---|---|---|---|---|
| 5,666,519 A * | 9/1997 | Hayden | ......... | G06F 9/4486 703/23 |
| 7,881,921 B1 * | 2/2011 | Dobbelaere | ......... | G06F 9/45537 703/22 |
| 2004/0054518 A1 * | 3/2004 | Altman | ......... | G06F 9/45537 703/27 |
| 2008/0022068 A1 * | 1/2008 | Taillefer | ......... | G06F 12/1009 711/202 |
| 2009/0119089 A1 * | 5/2009 | Gheith | ......... | G06F 9/45537 703/23 |
| 2011/0071813 A1 * | 3/2011 | Bohizic | ......... | G06F 12/1027 703/26 |
| 2011/0071814 A1 * | 3/2011 | Bohizic | ......... | G06F 12/1027 703/26 |
| 2011/0071815 A1 * | 3/2011 | Bohizic | ......... | G06F 12/1027 703/26 |

(Continued)

*Primary Examiner* — Kevin Verbrugge
(74) *Attorney, Agent, or Firm* — Nixon & Vanderhye P.C.

(57) ABSTRACT

A method is provided for controlling processing of target program code on a host data processing apparatus to simulate processing of the target program code on a target data processing apparatus. In response to a target memory access instruction of the target program code specifying a target address within a simulated address space having a larger size than a host address space supported by a memory management unit of the host data processing apparatus, an address space resizing table is looked up to map the target address to a transformed address within said host address space, and information is generated for triggering a memory access based on translation of the transformed address by the memory management unit of the host data processing apparatus.

20 Claims, 5 Drawing Sheets

(56) References Cited

U.S. PATENT DOCUMENTS

2011/0071816 A1\* 3/2011 Bohizic .................. G06F 9/328
  703/26
2014/0136179 A1\* 5/2014 Bohizic ............... G06F 9/45545
  703/26

\* cited by examiner

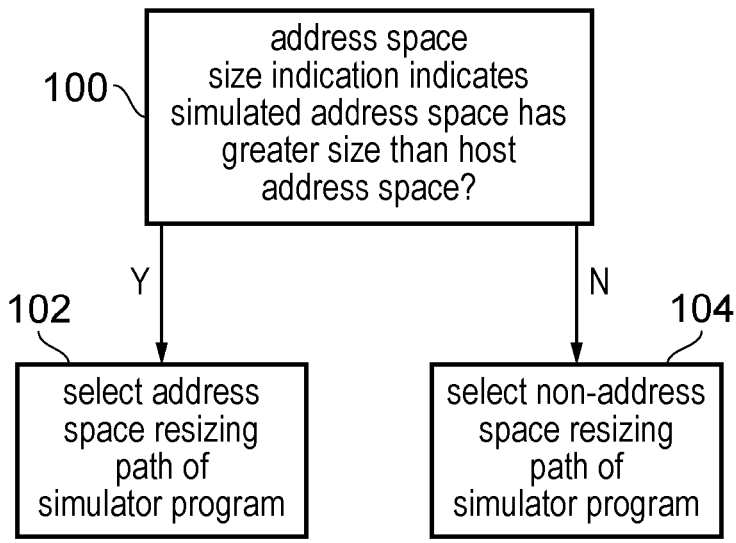
FIG. 5
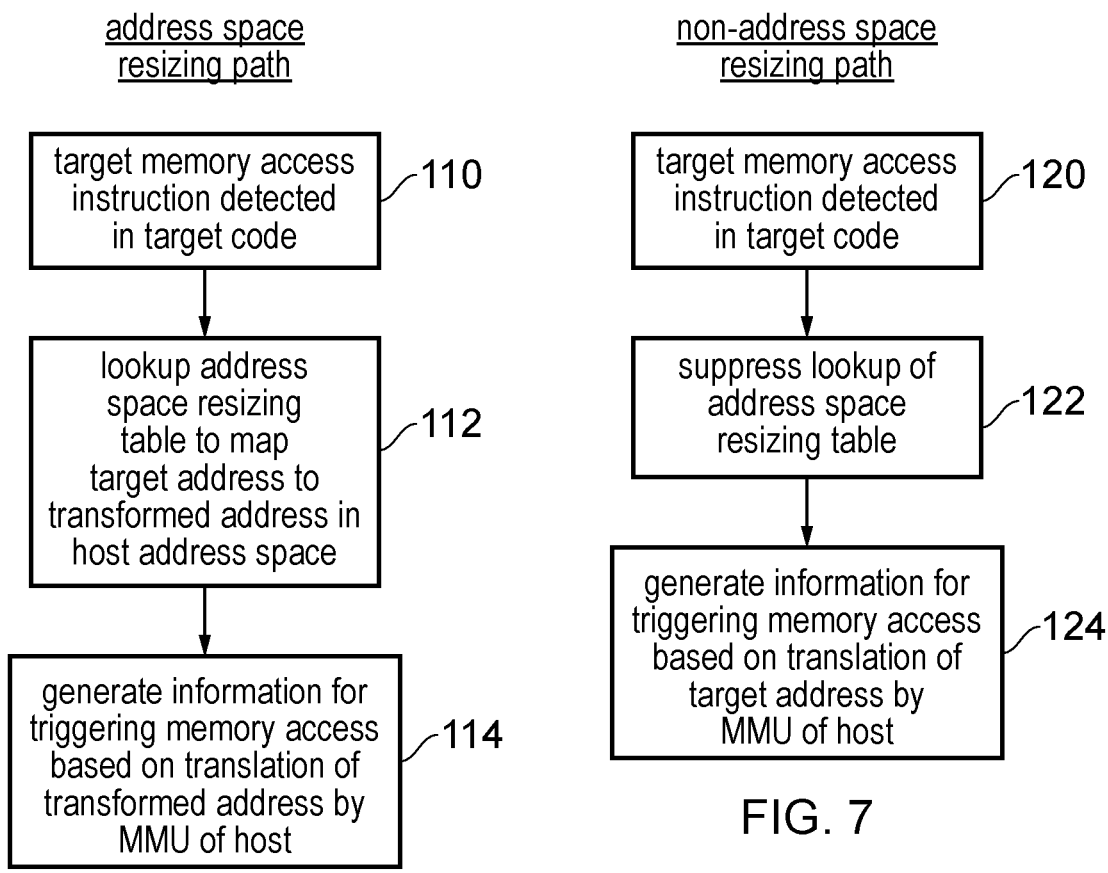
FIG. 6
FIG. 7

ADDRESS SPACE RESIZING TABLE FOR SIMULATION OF PROCESSING OF TARGET PROGRAM CODE ON A TARGET DATA PROCESSING APPARATUS

BACKGROUND

Technical Field

The present technique relates to the field of data processing. More particularly, it relates to the simulation of processing of target program code on a target processing data apparatus.

Technical Background

A simulation computer program may be provided for controlling processing of target program code on a host processing apparatus to simulate processing of the target program code on a target data processing apparatus. This can be useful for enabling the target program code, which has been written according to a certain instruction set architecture with certain features to be executed on a host data processing apparatus, which may not support those features. For example, the host apparatus may not support all types of instructions defined in the instruction set architecture. This may be useful for a number of reasons. For example, when the hardware of the target data processing apparatus supporting the instruction set architecture is still in development, it may be desirable to start development of software to execute according to that architecture, to reduce delay in software development once the target apparatus supporting the instruction set architecture is actually ready, and/or to provide feedback on how software executes on the architecture so that modifications to the architecture can be made if necessary. Another example may be for backwards compatibility reasons, where a piece of legacy software written for one architecture may be desired to be executed on a host data processing apparatus having a different architecture. Regardless of the particular reasons for performing the simulation, in general such a simulation may enable the target program code to execute on the host data processing apparatus to achieve functionality similar to that expected if the program target program code was executed on the target data processing apparatus, even if the host does not support the same features of the target data processing apparatus. For example certain hardware features of the target data processing apparatus may be simulated using software executed within the simulator program, or the simulator may map certain instructions of the target program code onto alternative instructions supported by the host data processing apparatus. However, there can be a design challenge in enabling the behaviour of the target program code to be simulated appropriately without introducing large performance overheads.

SUMMARY

At least some examples provide a method for controlling processing of target program code on a host data processing apparatus to simulate processing of the target program code on a target data processing apparatus; the method comprising:
in response to a target memory access instruction of the target program code specifying a target address within a simulated address space having a larger size than a host address space supported by a memory management unit of the host data processing apparatus:
looking up an address space resizing table to map the target address to a transformed address within said host address space; and
generating information for triggering a memory access based on translation of the transformed address by the memory management unit of the host data processing apparatus.

At least some examples provide a non-transitory storage medium storing a computer program for controlling the host data processing apparatus for performing the method above.

At least some examples provide a host data processing apparatus comprising processing circuitry and a non-transitory storage medium storing a computer program for controlling the processing circuitry to perform the method described above.

At least some examples provide a non-transitory storage medium storing a computer program for controlling processing of target program code on a host data processing apparatus to simulate processing of the target program code on a target data processing apparatus;
the computer program comprising:
instruction detection program logic to detect a target memory access instruction of the target program code specifying a target address within a simulated address space having a larger size than a host address space supported by a memory management unit of the host data processing apparatus; and
memory access control program logic responsive to detection of the target memory access instruction to look up an address space resizing table to map the target address to a transformed address within the host address space, and generate information for triggering a memory access based on translation of the transformed address by the memory management unit of the host data processing apparatus.

Further aspects, features and advantages of the present technique will be apparent from the following description of examples, which is to be read in conjunction with the accompanying drawings.

BRIEF DESCRIPTION OF THE DRAWINGS

FIG. 5 is a flow diagram illustrating functionality in the simulator program code for controlling whether the address space resizing table is used;

FIG. 6 shows a method of controlling memory accesses when the address space resizing table is used;

FIG. 7 shows an example method of controlling memory accesses when the address space resizing table is not used.

DESCRIPTION OF EXAMPLES

Figure 1:
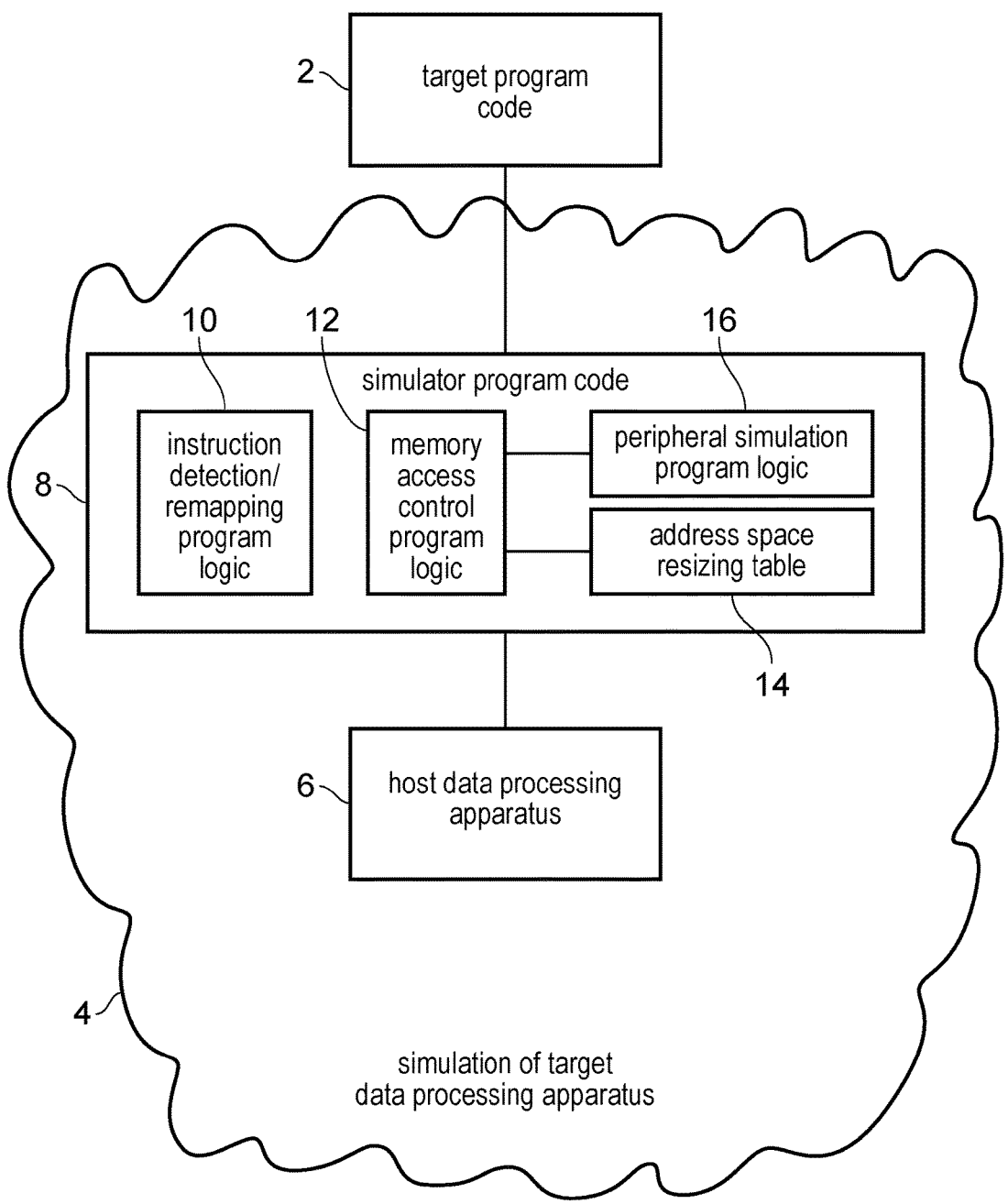
FIG. 1 schematically illustrates an example of a simulation of a target data processing apparatus using simulator program code executing on a host data processing apparatus so as to provide an execution environment for target program code similar to that expected in the target data processing apparatus.

The host data processing apparatus which is executing the simulation of the target data processing apparatus may have a memory management unit for controlling access to memory. For example the memory management unit (MMU) may provide address translation functionality and/or may implement memory access permissions such as controlling whether certain regions of memory are read only or are both readable and writeable, or for controlling which privilege levels are allowed to access certain regions of the address space. On the other hand, the target program code being executed on the simulation may use a simulated address space which could have a different size to the host address space supported by the MMU of the host data processing apparatus. In cases where the simulated address space has the same size or a smaller size than the host address space, there can be a one to one mapping of simulated addresses onto addresses of the host address space so that the addresses can be looked up using the MMU of the host data processing apparatus.

However, sometimes the simulated address space of the target program code may have a larger size than the host address space supported by the MMU of the host data processing apparatus. This can be more difficult to emulate because the number of bits representing the simulated addresses may be larger than the number of bits supported by the hardware of the MMU in the host data processing apparatus and so the memory translation mechanisms of the MMU, such as translation lookaside buffers and circuitry for controlling page table walks of page tables associated with the host address space, cannot be used for the simulated addresses. One approach for resolving this may be to provide, as part of the simulator program, a software emulation of the entire memory translation hardware provided by the MMU of the host data processing apparatus, so as to provide a software walk of page tables and maintenance of translation lookaside buffer structures. However, a problem with this approach is that lookups to the emulated MMU may often require multiple loads from multiple levels of nested page table structures to do a lookup of a single emulated address in the simulated address space. This can be extremely slow in terms of performance.

In the techniques discussed below, an address space resizing table is provided to map a target address specified by a target memory access instruction of the target program code in the simulated address space to a transformed address within the host address space. Hence, in response to a host target memory access instruction of the target program code which specifies a target address, the address space resizing table is looked up to map that target address to a transformed address in the host address space, and then information is generated for triggering a memory access based on translation of the transformed address by the MMU of the host data processing apparatus. Hence, the MMU of the host apparatus is reused during the simulation, to avoid needing to completely emulate a full page table structure associated with the larger simulated address space. The address space resizing table is provided to map the target address to a transformed address within the host address space which can be translated by the MMU. This combination of a partial software emulation to map the target address onto the host address space, and a hardware-based control of the memory access based on translation of the transformed address by the MMU, can provide much better performance because the simulated address mapping of the address space resizing table may be implemented with as little as a single load from memory, rather than multiple loads which would often be performed using complete emulation of a memory management unit in software. Also, as the address space resizing table only needs to compress the target address to a reduced size, rather than providing a full address translation at a page-by-page granularity, each entry of the address space resizing table may correspond to a larger block of addresses than one page table entry of the page table structure used by the MMU of the host, so it is more likely that lookups for a given address may hit in the cache. Therefore, this approach can provide better performance for the simulation of the target apparatus on the host.

The address space resizing table may map an X-bit portion of the target address to a Y-bit portion of the transformed address, where X is greater than Y. The table may be indexed based on the X-bit portion of the target address, and may return the Y-bit portion as the data output by the address space resizing table. The address space resizing table may be implemented as a software data structure maintained by the simulation program code executed on the host data apparatus to support the processing of the target program code as if it was executing on a target data processing apparatus.

Although the X-bit portion and Y-bit portion could be any portion of the target address and transformed address, in one example the X-bit portion comprises a most significant portion of M bits of the target address used to represent addresses within an M-bit simulated address space, and the Y-bit comprises a most significant portion of N bits of the transformed address within an N-bit host address space (where M>N). Hence, the upper bits of the address value may be mapped to a shorter upper portion to compress the addresses of the simulated address space onto the smaller host address space. A least significant portion of the transformed address may remain unchanged during the mapping so that the least significant portion of the transformed address equals the least significant portion of the target address.

Note that although the size of the address space is different between the simulated and host address spaces, this does not necessarily imply that the address values passed within the target program may necessarily have a greater number of bits than the address values used program instructions supported by the host data processing apparatus. It is relatively common in many data processing devices for the architecture to support addresses of a certain number of bits, for example 64 bits, but for not all of those bits to actually be used for addresses in some hardware structures or signal paths of the data processing apparatus. For example while instruction set architectures may have been designed to support 64-bit addresses to enable future expansion, and so registers of the processor may specify 64-bit addresses, in current devices it is very unlikely that a device needs $2^{64}$ separate addressable locations (i.e. 16 exabytes of memory) and so often fewer bits are used in practice for real addresses, and the upper portion of the 64-bit address in the registers may always be fixed to some predetermined value such as all 0 s or all 1 s, or to a sign extension of the most significant "real" bit of the address. Hence, micro-architectural structures, such as the MMU or data/instruction caches, may only provide support for fewer address bits (e.g. 48 bits)

to reduce circuit area and width of address buses, and the upper bits of the architectural addresses specified in registers may be ignored. In this case, the effective size of the address space supported by the apparatus would be a 48-bit address space, not a 64-bit address space. In this application, the size of the address space refers to the meaningful range of addresses corresponding to the portion of the memory addresses which comprises bits which may vary in bit value, excluding the upper portion which is restricted to having some fixed value or sign-extended value or which is restricted to having all ones or all zeroes, or which is not considered by the hardware for the purpose of selecting which memory location to access.

Hence, it will be appreciated that the most significant portion of the target address used as the X-bit portion to be mapped by the address space resizing table may not necessarily be the actual most significant bits of the 64-bit address that is theoretically possible in the architecture, but refers to the most significant portion of the set of bits within the address which actually represent real values indicative of which memory location to access. Hence, where P is the number of bits included in address values supported by the target architecture, and Q is the number of bits included in address values supported by the target architecture: M P, where M is the number of effective bits used for addresses in the simulated address space; and N Q, where N is the number of effective bits used for addresses in the host address space. P and Q could be the same or different (e.g. P could be greater than Q if, for example, a 64-bit architecture is simulated on a 32-bit processor).

The address space resizing table may be stored in a region of the host address space which is reserved for simulation control information which is inaccessible to the target program code. Separately, the target program code could also implement a page table structure representing memory permissions or address translations of the simulated address space, which is accessible to and maintained by the target program code, but the address space resizing table is separate from this and is maintained by the simulator program to permit the target data program code to execute on the host which has a different size address space.

The address space resizing table may map at least one valid address in the simulated address space to an invalid address in the host address space. For example, certain regions of the host address space could be prevented from being mapped to valid host addresses. The address space resizing table may specify an address in one of those invalid regions for at least one valid address in the simulated address space. Specifying some valid addresses in the simulated address space as invalid addresses in the host address space is useful because, as the larger simulated address space is being mapped onto a smaller host address space, it is not possible to have all the addresses of the simulated address space simultaneously valid and mapped to distinct addresses of the host address space. Also, mapping to invalid addresses in the host address space can be used for portions of the emulated address space that do not correspond to devices in the host address space (e.g. emulated peripherals). Hence at least some target addresses may be mapped to invalid transformed addresses.

When a target memory access of a target program code specifies a target address in the simulated address space which is mapped by the address resizing table to an invalid address in the host address space, then the memory access performed on the host data processing apparatus may trigger the MMU to signal a fault in response to the attempted translation of the transformed address. In response to such a fault, the simulation may determine whether the target address did correspond to a valid address in the simulated address space. Faults could be triggered by the MMU of the host data processing apparatus for a number of reasons when there is an attempt to translate the transformed address. One reason may be that although the target address was valid in the simulated address space, due to the limited size of the host address space available, the address space resizing table mapped the address to an invalid address in the host address space. However, another possible reason could be simply that the target address has not yet been mapped into the simulated address space by the page tables maintained by the target program code. Therefore, the simulator code may include program logic for responding to the fault triggered by the MMU of the host data processing apparatus when an attempt was made to translate a transformed address, by determining (e.g. based on page tables associated with the simulated address space) whether the simulated address space corresponds to a valid address in the simulated address space.

When it is determined that, following the fault triggered by the MMU, the target address did correspond to a valid address in the simulated address space, then the address space resizing table may be updated to remap one or more addresses of the simulated address space including the target address to valid addresses in the host address space. Hence, if the fault was triggered as an artefact of the simulation (as a result of the address space resizing table having to map a larger number of addresses onto a smaller set of addresses in the host address space), this fault can be addressed by changing the mapping provided by the address space resizing table so that the target address sought to be accessed in the simulated address space by the target program code will now correspond to a valid address in the host address space to enable the memory access to proceed. If there are some available valid addresses in the host address space which can be mapped to the target address, then one of these addresses can be used and it may not be necessary to remap any other addresses of the simulated address space to invalid addresses. However, when the target address corresponds to a valid address in the simulated address space and available addresses of the host address space which are available for mapping to valid addresses of the simulated address space are all exhausted, then one or more victim addresses of the simulated address space which were previously mapped to valid addresses of the host address space may be remapped to invalid addresses of the host address space. Hence, if the address space resizing table has already used all available valid addresses of the simulated address space then in order to accommodate a valid mapping of the target address to a valid address in the host address space, at least one other address may have to be eliminated from the valid portion of the host address space and mapped to an invalid address. The victim addresses could be selected in any way, such as by a random selection policy or by a round robin or least recently used policy. For some victim selection policies the one or more victim addresses may be selected based on the eviction policy information specified for associative blocks of addresses in the address space resizing table. The eviction policy information could be an indication of which was the most recently evicted address or the least recently allocated, or could be block-by-block policy information specified in each entry of the address space resizing table, for example for tracking usage of each entry so as the enable a more careful selection of the victim address which is expected to be least likely to be needed in future. Any victim selection policy and type of eviction policy information which is known for use in handling evictions in cache data structures could also be used for the address space resizing table.

On the other hand, if following the fault triggered by the MMU of the host in translation of the transformed address, it is determined that the target address corresponds to an invalid address in the simulated address space, then a simulated exception may be signalled, to trigger updating of a simulated page table associated with a simulated address space. For example the simulated exception may be signalled to a simulated exception handler within the target program code to trigger a routine for updating the simulated page table.

Another use of the indications of invalid addresses in the address space resizing table may be to provide simulation of peripheral devices which may not actually be provided by the host data processing apparatus but were expected to be provided in the target data processing apparatus. Hence, at least one valid address which is mapped to a peripheral device in the simulated address space may be mapped by the address space resizing table to an invalid address in the host address space. Again, in this case if the target program code triggers a memory access based on an address of the simulated address space which is mapped to a peripheral device, then the address space resizing table maps this to an invalid address in the host address space, and translation of this address may trigger a fault from the MMU of the host data processing apparatus. In response to the MMU fault, the simulator may then determine whether the target address was mapped to the peripheral device in the simulated address space. When the target address is mapped to a peripheral device, then the simulator may access peripheral simulation program logic for simulating a behaviour of the peripheral device.

The address space resizing table need not be used for all instances of simulation using the simulator program code. For example the same simulator program may be designed to be compatible with a range of target program code which may operate with simulated address spaces of different sizes. Hence, the simulator program code could have functionality for looking up an address space size indication indicative of whether a size of the simulated address space used by the target program code is greater than the size of the host address space of the MMU of the host apparatus. Hence, in response to the target memory access instruction, when the address space indication indicates that the simulated address space has the same size or a smaller size than the host address space, the lookup of the address space resizing table may be suppressed and information may be generated for triggering the memory access based on the translation of the target address by the MMU of the host data processing apparatus. That is, if the simulated address space is equal in size or smaller than the host address space, then there is no need for address space resizing and the hardware of the MMU can be applied directly to the target address provided by the target code. On the other hand, when the address space indication indicates that the simulated address space has a greater size than the host address space, the address space resizing table may be looked up and information for triggering the memory access based on translation of the transformed address by the host MMU may be generated as discussed above. Hence, although in general a simulator program may support resizing using the address space resizing table, it is not essential to use that functionality for every piece of target program code being executed above the simulator.

The information for triggering the memory access based on the mapped transformed address provided by the address data resizing table could in some cases merely comprise the transformed address itself, which can then be read by a memory access instruction of the simulator program to trigger the host to access memory.

Alternatively, the information generated based on the transformed address may comprise a host memory access instruction of an instruction set architecture which is supported by the host data processing apparatus. For example, the simulator code could translate a portion of the target program code into a portion of host code to be executed by the host apparatus, which may include the generated host memory access instruction corresponding to the target memory access instruction of the target code. The host memory access instruction may specify the transformed address as its target address. The host memory access instruction may be executed by the host data processing apparatus using its MMU in the same way it would execute a memory access instruction within code executed on the host other than the target program code or the simulation.

The host memory access instruction could be generated by the simulator at the time of actual execution of operations corresponding to the target program code. Hence, in some cases the host memory access instruction may be executed in response to detection of the target memory access instruction. That is, the detection of the target memory access instruction may trigger both the remapping of the target address to the transformed address, and the execution of the host memory access instruction.

Alternatively, the host memory access may be generated ahead of time to translate the target program code into code which is executable on the host data processing apparatus, even if the translated code is not immediately executed. Hence, in response to detection of the target memory access instruction in the target program code, the generated host memory access could be stored for later execution and does not need to be executed by the host data processing apparatus immediately.

Also, some approaches could combine the two options discussed here, so that the first time a memory access instruction in the target program code is encountered it could be mapped to a corresponding host memory access instruction specifying the transformed address which may be executed immediately, but the host memory access instruction could also be stored to memory or to a cache so that the next time the same portion of target program code is encountered, it is not necessary to perform the translation and the address space resizing table lookup again, as the previously stored host memory access instruction may already be available. Hence it will be appreciated that the address space resizing lookup need not be performed every time the target memory access instruction is encountered in the target program code, as stored information from a previous time could be used. The simulation program may include program logic for looking up the address space resizing table in response to at least one instance of a target memory access instruction within the target program code, but need not do so for every instance when a target memory access instruction is encountered.

The method may be controlled by a simulator computer program stored on a storage medium. The storage medium may be a non-transitory storage medium. For example the computer program representing the simulator may include instruction detection program logic for detecting the target memory access instruction of the target program code which specifies a target address within the simulated address space having a larger size than the host address space supported by the MMU of the host data processing apparatus. The computer program may also have memory access control program logic which responds to the detection of the target memory access instruction to look up an address space resizing table as discussed above, to map the target address to a transformed address and generate information for triggering a memory access based on translation of the formed address by the MMU of the host data processing apparatus. For example the instruction detection program logic could comprise a series of "if" statements within the simulator program code for interpreting the encoding of the instruction of the target program code and checking whether it maps to a pattern representing a memory access instruction. The memory access control program logic could be a corresponding "then" routine which is executed if the instruction detection program logic detects that the instruction is a target memory access instruction, and may include program instructions for performing the lookup of the address space resizing table and for generating the information for triggering the memory access based on the transformed address. In some cases the memory access control program logic may include a load/store instruction (serving as the host memory access instruction described above) which specifies as an address defining operand a register to which information defining the transformed address is written by a portion of code for performing the lookup of the address space resizing table.

FIG. 1 schematically illustrates an example of a simulation of a target data processing apparatus for executing target program code 2. The simulation 4 is provided using a host data processing apparatus 6 providing hardware which supports a certain host instruction set architecture (ISA) and simulator program code 8 defined according to the host ISA which executes on the host data processing apparatus 6. The simulator program code 8 provides an interface to the target program code 2 which is similar to the interface which would be provided to the target program code 2 if the target program code 2 was executed by a target data processing apparatus which has hardware support for the target ISA with which the target program code 2 is written. The host data processing apparatus 6 may not support all the functionality of the target ISA and so such functionality can instead be simulated by software program logic and data structures maintained by the simulator program code. In other words, the instruction execution environment which is provided by the simulator program code 8 when executing on the host data processing apparatus 6 may be the same or substantially the same as the instruction execution environment provided by a real target data processing apparatus supporting the architecture expected for the target program code 2. Simulator programs 8 may be implemented using a variety of methods. Varieties of simulator computer programs include emulators, virtual machines, models, and binary translators, including dynamic binary translators. While the simulator program code 8 is shown as a single layer of program code 8 in FIG. 1, in some examples there may be multiple layers of simulation between the host hardware 6 and the target program code 2. Also, while FIG. 1 shows a single instance of simulator program code 8, some systems may support multiple distinct simulation environments provided on the same host processor to support target code designed for different instruction set architectures.

Hence, the processing circuitry, instruction decoder support and memory access hardware of the target apparatus may be simulated by the simulator program code 8 using suitable software constructs or features. For example, the instruction decode circuitry and processing circuitry for implementing the processing operations corresponding to certain types of instructions according to the target ISA may be implemented using instruction detection/remapping program logic 10 within the simulator program code 8. Also, memory access control program logic 12 may be provided for performing operations for controlling access to memory by the target program code 2, such as address translation functionality or page table management. Part of the function of the memory access control program logic may be to map addresses of the simulated address space used by the target program code 2 onto the host address space used by the host apparatus 6, e.g. using an address space resizing table 14 which will be discussed later. The simulated program code may also include peripheral simulation program logic 16 which may simulate the behaviour of peripheral devices which are not actually provided in the host apparatus 6 but may be simulated as if they are present. An overview of simulation is given in "Some Efficient Architecture Simulation Techniques", Robert Bedichek, Winter 1990 USENIX Conference, Pages 53-63. Any of the simulation techniques discussed in this paper may be used to implement the simulator program code 8 shown in FIG. 1. A recording medium may be provided to store the simulator program 8, which may be a non-transitory program medium.

Note that in some cases the target program code 2 may include not only applications to be executed, but also program code corresponding to more privileged levels of execution, such as operating systems and/or hypervisors. Hence the target program code 2 need not correspond to a single application but could correspond in general to a set of code to be executed on the simulation 4 as if it was executing on the target data processing apparatus.

Figure 2:
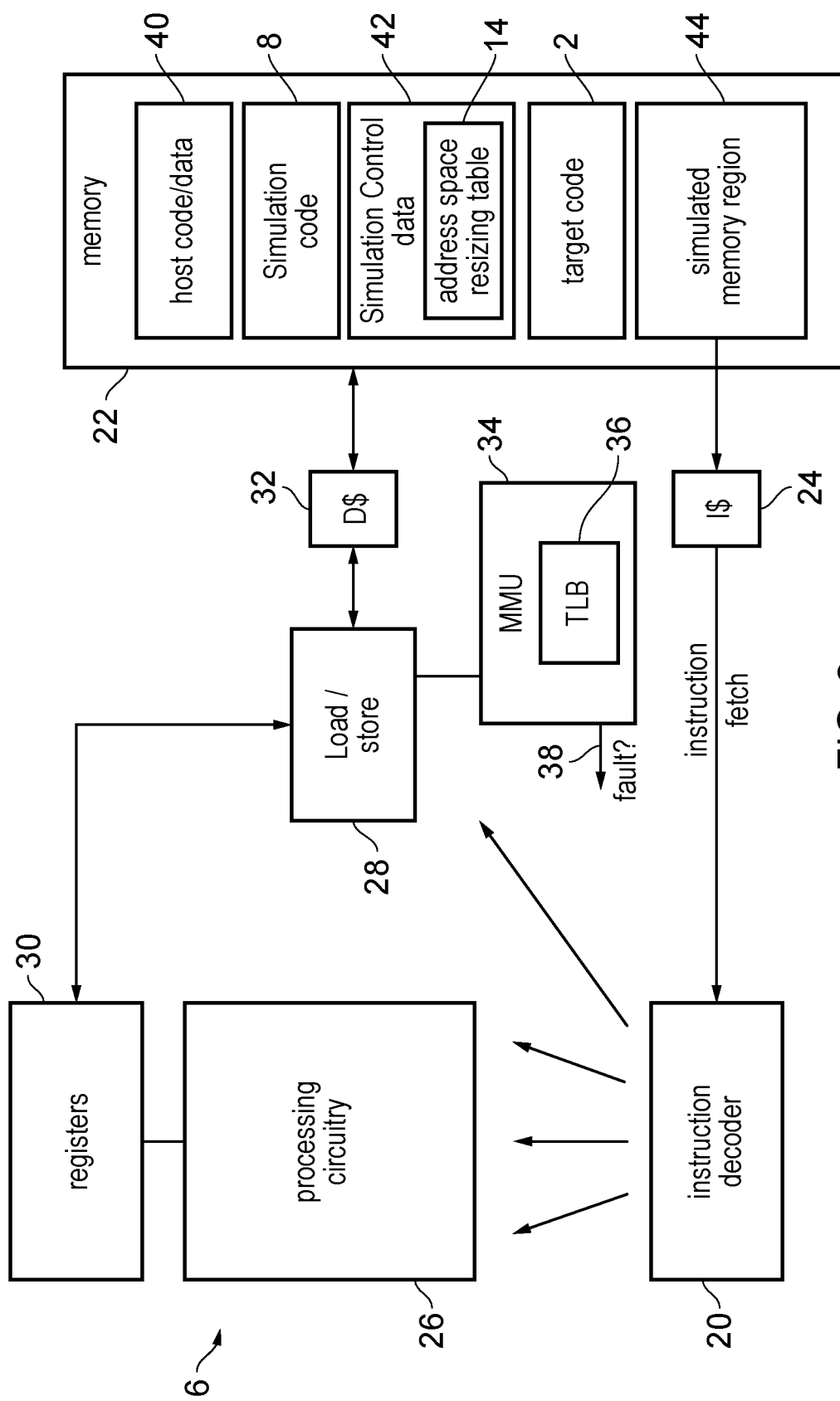
FIG. 2 schematically illustrates an example of the host data processing apparatus.

FIG. 2 schematically illustrates an example of the host data processing apparatus 6 for executing the simulator program code 8 and the target program code 2. The host apparatus 6 has an instruction decoder 20 for decoding instructions fetched from memory 22 via an instruction cache 24, and in response to the decoded instructions, generating control signals for controlling execution units 26, 28 to perform operations corresponding to the decoded instructions. For example the execution units may include processing circuitry 26 for performing arithmetic or logical operations in response to arithmetic or logical instructions, and a load/store unit 28 for performing load/store (memory access) operations to transfer data between memory 22 and registers 30, possibly via a data cache 32. The processing circuitry 26 may itself include a number of different execution units, for example an integer ALU for performing integer arithmetic or logical operations, a floating point unit for performing operations on floating point operands, and a vector processing unit for performing vector operations involving vector operands comprising multiple data elements. The processing circuitry 26 reads source operands from the registers 30, processes the source operands and writes the results of processing back to the registers 30.

The load/store unit 28 performs load and store operations using memory addresses calculated based on source values in registers 30 and/or parameters specified in the encoding of the instructions decoded by the instruction decoder 20. The addresses derived from the instruction encoding and/or register operands are virtual addresses. A memory management unit (MMU) 34 is provided to translate the virtual addresses into physical addresses used by the memory system 22, 32, 24 (in some examples, the MMU 34 could be part of the load/store unit 28). For example the MMU 34 may have a translation lookaside buffer (TLB) 36 for caching portions of page tables from the memory 22 which define address mappings from virtual to physical addresses. In some cases, the host may support a two-stage address translation process where the virtual addresses are translated into intermediate addresses under control of a first set of page tables and then the intermediate addresses are translated into physical addresses under control of a second set of page tables. In some cases the MMU hardware may implement both stages of address translation in a single set of TLB entries, to provide a combined mapping direct from virtual address to physical address even though such mappings are defined through two separate sets of page tables, one corresponding to the virtual-to-intermediate address mapping, and another corresponding to the intermediate-to-physical address mapping. The use of two separate sets of page tables is useful for supporting virtualisation where the stage 1 page tables could be maintained by operating systems and stage 2 page tables by a hypervisor, to allow multiple operating systems using conflicting virtual addresses to coexist in one system.

The MMU design may be provided according to any known memory management technique. In addition to implementing the address translation the MMU may also control access permissions to memory to prevent certain memory regions being accessible to certain pieces of software. When the load/store unit triggers the memory access, the MMU looks up the TLB 36 to determine whether the address is valid, and is allowed to be accessed by the current process, and if so identifies the corresponding physical address to be provided to the memory system to perform the memory access. If the page table entry associated with the required address is not already present in the TLB 36, the MMU may trigger a request for the entry to be obtained from memory, e.g. by performing a page table walk (the TLB may be seen as a cache of the information available in the page tables), and if a valid entry has been defined in the page tables then this will provide the required physical address once available. On the other hand, if the address is invalid (e.g. no address mapping has yet been defined by the operating system) or the access permissions are denied, then a fault signal 38 may be issued to signal that a fault has been detected. In response to the fault the processing circuitry 26 may execute an exception handling routine for dealing with the fault, for example by remapping the page tables to so that the required address now becomes valid.

When executing the simulator program code 8 and target program code 2 as shown in FIG. 1, then regions in the host memory address space of the memory 22 are allocated for a number of different purposes, including:

Host code/data 40. This represents program code and data used by the host which is not directly related to the simulator 8 or the target program code 2, but may for example represent other applications, operating systems or hypervisor software of the host processor Simulation code 8. This is the simulator program code 8 shown in FIG. 1 for controlling the host data processing apparatus 6 to behave, when executing the target code 2, as if it is the target data processing apparatus.

Simulation control data 42. This represents control data used by the simulator program code 8 to provide an emulation of the properties of the target data processing apparatus. For example some instructions of the target code 2 may require some additional metadata to be stored by the simulator to ensure the response to subsequent instructions is similar to that expected if the earlier instruction of the target code had been executed on a real target data processing apparatus. Also the simulation control data 42 could include translated portions of target code which have been mapped to host instructions supported by the instruction decoder 20 of the host apparatus 6. Also the simulation control data may specify the address space resizing table 14 which will be discussed in more detail below. The simulation control data 42 may be allocated to a region of the host address space which is inaccessible to the target code 2. The target code 2 itself.

A simulated memory region 44. This represents a region of the host address space which has been allocated for use by the target code 2 to simulate a corresponding part of the simulated address space from which the addresses are specified by the target code 2. The address space resizing table 14 may map the simulated address space onto addresses within the simulated memory region 44.

While the regions 40, 8, 42, 2, 44 are shown in FIG. 2 as distinct contiguous blocks in memory, it will be appreciated that each of these blocks could be mapped to multiple discontiguous regions of the host address space.

Figure 3:
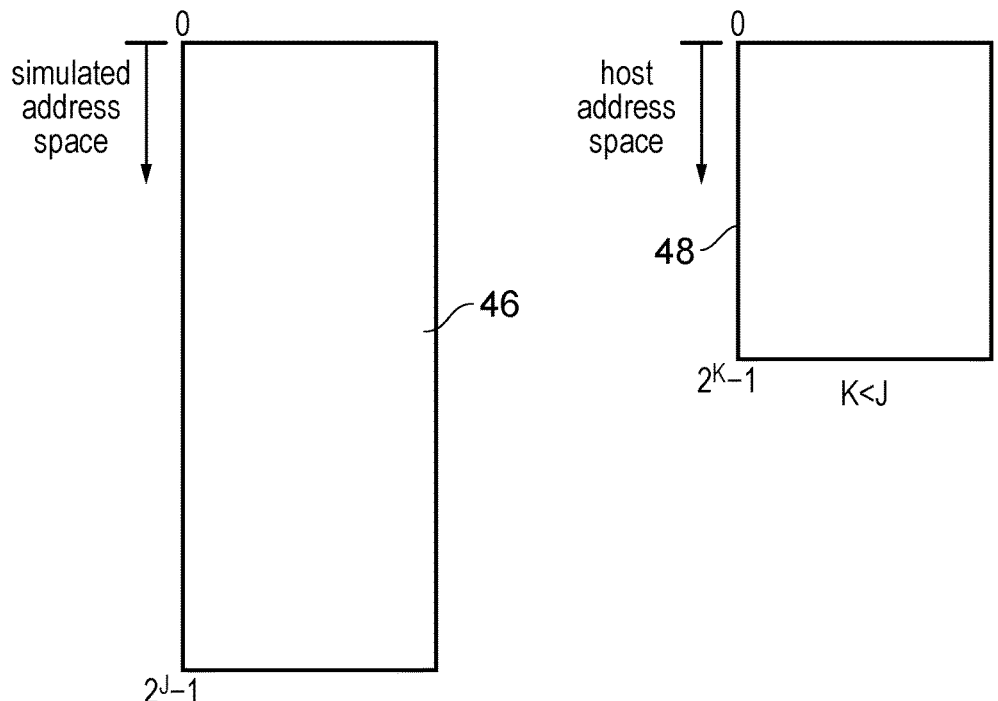
FIG. 3 shows an example where the host address space has a smaller size than the simulated address space used by the target program code.

As shown in FIG. 3, the simulated address space 46 expected by the target code 2 could be larger than the host address space 48 used by the MMU 34 of the host data processing apparatus 6. For example the simulated addresses may use J bits to represent the meaningful address bits of addresses within the simulated address space while the host address space may use K bits (K<J). As discussed above, it will be appreciated that the addresses may actually be represented in architectural registers by more than J or K bits, with some upper address bits always fixed to some value like 0 or 1, or set to a sign-extension of the next most significant bit (e.g. with a 50-bit address space bits 63 to 50 could be fixed to the same value as bit 49), due to the architecture supporting future expansion of memory capacity not yet supported in hardware micro-architecture. However, the J or K bits refer to the portion of the meaningful address bits which have variable values identifying the specific memory location to be accessed.

Figure 4:
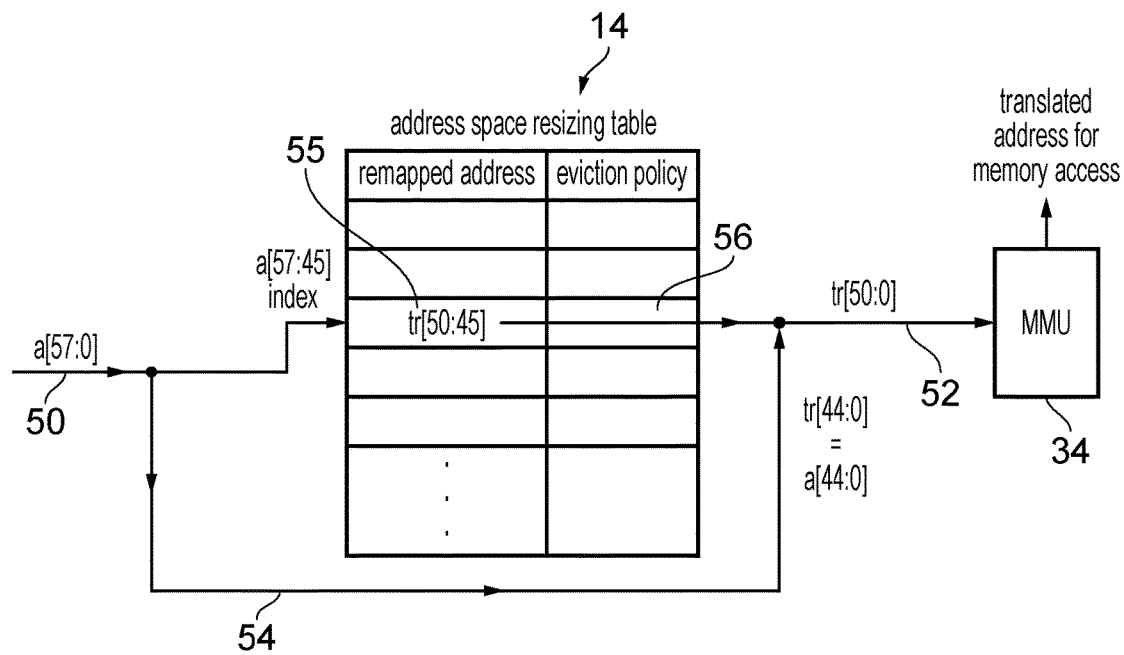
FIG. 4 shows an example of use of an address space resizing table to map target addresses specified by the target program code into a transformed address within the host address space.

FIG. 4 shows use of the address space resizing table 14 for mapping a target address a[57:0] 50 specified by a target memory access instruction of the target code to a transformed address 52 for looking up in the host MMU 34 of the host data processing apparatus 6. In this example, J=58 and K=51, but it will be appreciated that this is just one example of possible bit widths. The least significant portion 54 of the target address, which in this example comprises bits a[44:0] of the target address 50, is mapped unchanged to corresponding bits tr[44:0] of the transformed address 52. On the other hand, the most significant portion a[57:45] of the target address is used to index into the entries of the address space resizing table 14 which is provided as a software data structure in the simulation control region 42 of memory. Each entry of the table 14 specifies a remapped portion tr[50:45] 55 of the transformed address 52 which corresponds to the corresponding index of the target address 50. Also each entry may optionally specify eviction policy information 56 for controlling which entry to evict or remap to an invalid address when there are no available valid addresses in the simulated memory region 44 of the host address space 48 which are not already mapped to other addresses of the simulated address space 46.

Hence, the simulation program code may include program code logic for looking up an array of data in memory representing the address space resizing table 14, to identify the transformed upper bits 55 of the transformed address 52 which map to the upper portion of the original target address 50, and then these may be concatenated with the lower portion 54 of the target address to form the transformed address 52. The memory access control program logic 12 may then return the transformed address and the instruction remapping program logic 10 may generate a host load/store instruction specifying the transformed address 52 as its target memory address. The host memory access instruction could either be executed immediately, in which case the load store unit 28 may trigger the MMU 34 to perform an address translation lookup for the transformed address and return a physical address which can then be used to access memory. Alternatively, or in addition, the host memory access instruction could be stored as translated code within the simulation control data 42 so that at a later time it can be executed without needing to repeat the address space resizing operation and the mapping of the target memory access instruction into the host memory access instruction.

Hence rather than attempting to fully emulate the MMU 34 of the target data processing apparatus in software, this approach reuses the host MMU 34 which can only remap addresses within a smaller address space, but uses an address space resizing table 14 provided as a software data structure to remap the larger simulated address space 46 onto a smaller address host space 48 so that the MMU can be reused. This improves performance relative to complete software emulation of an MMU.

While FIG. 4 shows an example where the most significant portion of the address is remapped by the address space resizing table, as this can improve cacheability properties, it would also be possible to use the address space resizing table to provide remapping of other portions of the target address onto translated smaller portions of the transformed address. The number of entries in the address space resizing table can be tuned depending upon the efficiency of lookup, implementation and memory usage trade-offs. For example, by mapping a larger block of addresses from the simulated address space onto a single entry of the address space resizing table, this can reduce the overhead of maintaining the address space resizing table 14, and make it more likely that the address space resizing table can fit in a cache to speed up successful lookup, however each entry may represent a larger chunk of memory which may cause entries to be replaced more often. Hence, the precise implementation of the relative sizes of chunks of memory corresponding to each address space resizing table entry may be an implementation choice for the system designer depending upon the needs. Hence, the exact number of bits of the index portion of the target address 50, the remapped portion 55 of the transformed address 52, and the unchanged portion 54 shown in FIG. 4 is just one example.

With this approach, in the case where the target address maps onto a valid table entry, which should be the normal case, the mapping only requires one additional load on top of the operation already needed to emulate a given instruction. The table 14 can be designed so that the additional load is more likely to hit in the cache to accelerate the emulation. This is significantly better for performance over multiple loads to a diverse structure which would be required for a typical emulation of an MMU or TLB in software.

FIG. 5 is a flow diagram illustrating functionality which may be performed in the simulator program code 8. At step 100 the simulator 8 determines whether, for the particular target program code 2 being executed, an address space size indication indicates that the simulated address space used by the target program code has a greater size than the host address space. For example this check may be performed as part of the initial simulation configuration settings performed before the target program code execution begins, for initializing parts of the simulation control data appropriately. For example the simulation control data 42 could include a flag which specifies whether the simulated address space has a greater size than the host address size and hence whether address space resizing is needed. If the address space size indication indicates that the simulated address space 46 has a greater size than the host address space 48 then at step 102 control settings are made to select an address space resizing path of the simulator program. For example the simulator program code 8 may include an alternative sub branch which includes the operations for accessing the address space resizing table and generating the corresponding transformed address 52. On the other hand, if the address space size indication associated with the target code 2 did not indicate that the simulated address space has a greater size than the host address space, then at step 104 the simulator code selects a non-address space resizing path of the simulated program 8. For example, the simulated program code may either set a flag in the simulation control data to ensure that subsequent parts of the program code will not include address space resizing, or could branch to a function routine which does not include the address space resizing. It will be appreciated that an alternative way of implementing this selective address space resizing could be to perform the check 100 at every memory access instruction of the target code. However, it may be more efficient to perform the check once when the target code 2 starts executing, and then to traverse different branches or subroutines of the simulator program depending upon whether address space resizing is needed.

FIG. 6 shows a method executed by the simulator program code when the address space resizing path is selected. At step 110 the instruction detection and remapping program logic 10 of the simulator 8 detects a target memory access instruction within the target program code 2. In response, at step 112, the address space resizing path of the simulator program code 8, e.g. within the memory access control program logic 12, looks up the address space resizing table 14 to map the target address 50 specified by the target memory access instruction detected at step 110 to the transformed address 52 in the host address space. If the target address 50 was not already mapped to a transformed address in the address space resizing table 14, then at this point the simulator may allocate the target address a particular transformed address within the simulated memory region 44 of the host address space. At step 114 the simulator program code (e.g. through the instruction remapping program logic 10) also generates information for triggering a memory access based on the translation of the transformed address by the MMU 34 of the host apparatus 6. For example the information generated at step 114 could be a load/store instruction defined according to the host ISA which specifies as its target address the transformed address 52 resulting from the lookup of the address space resizing table 14. This host load store instruction could be executed immediately, and/or could also be stored to memory for a later execution.

FIG. 7 shows a flow diagram illustrating handling of target memory accesses in the target code 2 in the non-address space resizing path of the simulator program code 8. Again, at step 120 a target memory access instruction specifying a target address in the simulated address space 46 is detected within the target program code 2 by the instruction detection and remapping program logic 10 of the simulator 8. In response, at step 122 the lookup of the address space resizing table 14 is suppressed. The non-address space resizing path may not include any instructions for accessing the address space resizing table and instead the target address may be mapped directly (in a one-to-one mapping) onto the corresponding host addresses in the simulated memory region 44 of the host address space. In this case, the page tables used by the MMU 34 of the host may provide the sole level of memory translation and there is no need to use the address space resizing table 14. Hence at step 124 the information for triggering the memory access is generated based on translation of the target address by the MMU of the host, rather than using the transformed address as in step 114 of FIG. 6. For example, at step 124 the instruction remapping program logic may generate a load/store instruction specifying a target address selected based on the target address specified by the original target memory access instruction in the target code. For example, the generated load/store instruction could specify the same target address as the target address of the original target memory access instruction, or a fixed offset could be applied to the target address of the original target memory access instruction to obtain the target address of the generated load/store instruction. For example, all simulated memory could be mapped at 0x1,0000,0000+address, so the target address may need this offset to be added before passing the address to the host MMU. Regardless of how the target address of the generated load/store instruction is generated from the target address of the original target memory access instruction, the target address can be translated by the MMU to obtain the corresponding physical address for accessing memory.

As the address space resizing table 14 maps a portion of the target address 50 having a certain number of bits onto a portion of the translated address 52 having fewer bits, it is not possible for every entry of the address space resizing table 14 to simultaneously correspond to a valid address within the host address space. Hence at least some entries may specify invalid values. For example, reserved address values, e.g. addresses having an initial portion of all 1 s, could be reserved as invalid and so the invalid entries of the address space resizing table could specify reserved values as the remapped address portion 55. Hence, sometimes, even though the target address 50 was valid in the simulated address space 46, the transformed address 52 provided by the address space resizing table 14 may be invalid in the host address space 48 and this may trigger the MMU 34 to generate a fault.

Figure 8:
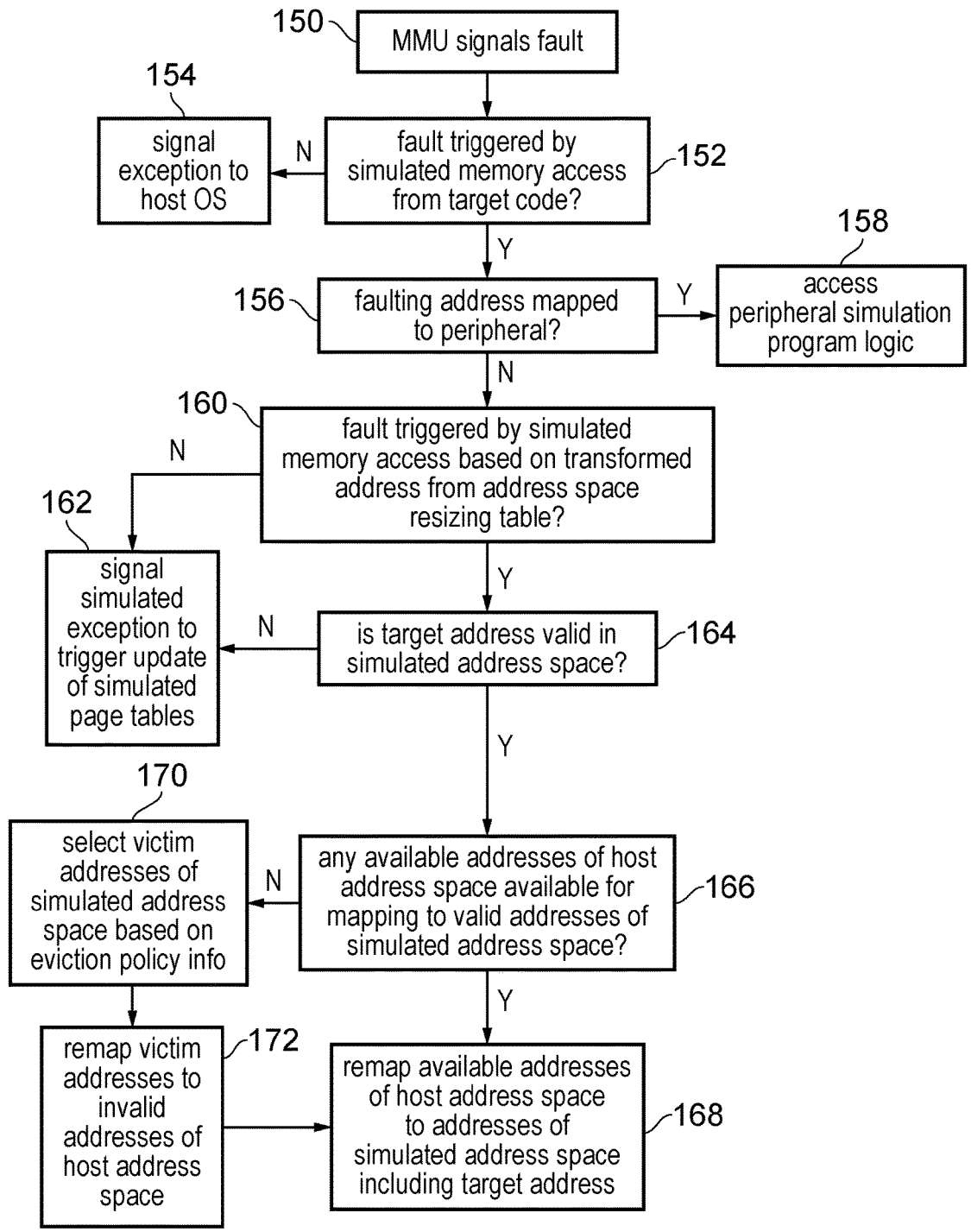
FIG. 8 shows a flow diagram indicating a method of handling faults triggered by the memory management unit of the host data processing apparatus during simulation of processing of the target code on the target data processing apparatus.

FIG. 8 is a flow diagram showing how when the host MMU 34 triggers a fault 38 and the fault was triggered by translation of a transformed address 52 generated using the address space resizing table 14, the simulator program code 8 may respond to that fault. At step 150 the host MMU 34 signals that a fault has been detected for the current address lookup. At step 152 the simulator program code 8 (or an exception handler executing on the host) checks whether the fault was actually triggered by a simulated memory access from the target code 2, and if not then at step 154 the exception is signalled to the host operating system (part of the host code 40). In this case, the fault was triggered by a memory access from some other piece of code which is not related to the simulation, and so the host operating system can deal with this, for example by remapping page tables to provide a valid address mapping for the required address, by adjusting memory access permissions, or by suspending execution of the code attempting to access addresses which it is prohibited from accessing.

If at step 152 it is determined that the fault was triggered by a simulated memory access from the target code, then at step 156 the simulator program determines whether the faulting address was mapped to a peripheral device in the simulated address space 46. Some regions of the simulated address space may be expected in the target apparatus to correspond to a peripheral device provided in hardware, but in the host apparatus, such peripheral devices may not actually be present and instead the behaviour of the peripheral device may be emulated in software. The address space resizing table 14 can be reused to provide an efficient way of invoking the peripheral simulation program logic 16 for providing the emulated peripheral behaviour. Hence, when target addresses are within the region mapped to peripherals, then the corresponding entries in the address space resizing table 14 may specify an invalid address in the host address space and so when this target address is accessed by the target program code, it may trigger an MMU fault by the host MMU 34, and then at step 156 the simulator may determine that the original target address 50 was in one of the regions corresponding to the peripheral and if so then at step 158 the simulator may access the peripheral simulation program logic 16 and execute corresponding software instruction routines to provide the behaviour expected from the peripheral. An alternative approach would be to check whether addresses are mapped to a peripheral when the original memory access instruction is detected in a target code as in FIG. 6 or 7, but in this case then all memory accesses would be delayed because of the need to check some data structure indicating which regions are mapped to peripherals. By instead using the address space resizing table to provide invalid host addresses for those memory regions mapped to a peripheral and then using the fault signalling mechanism of the host MMU to then trigger the access to the peripheral simulation program logic, it is only those target memory accesses in a target code which trigger an MMU fault which require checking for whether they map to a peripheral, which speeds up handling of most memory accesses in the normal case where no fault is triggered.

If it is determined at step 156 that the faulting address was not mapped to a peripheral, then at step 160 the memory access control program logic 12 of the simulator code 8 determines whether the fault was triggered by a simulated access which is based on a transformed address from the address space recycling table 14. If not, then this memory access may have been triggered by the non-address space resizing path of FIG. 7 and so this would indicate that the fault is not an artefact of the address space resizing table. In this case, a possible reason for the fault may be that the simulated page tables associated with the target code 2 (which may for example be maintained by a target operating system which forms part of the target program code) did not map that particular target address to a valid address. In this case at step 162 the simulator program 8 signals a simulated exception to the target program code 2, which may then trigger an update of simulated page tables maintained by the target program code. Once the simulated page tables have been updated then the target program code may attempt to re-execute the target memory access instruction which led to the fault. Hence, the simulated exception may effectively simulate in software the exception or fault which would be expected to be signalled by a hardware MMU 34 if there was no valid page table mapping for the required address.

On the other hand, if at step 160 the fault was triggered by a simulated memory access which was based on a transformed address from the address space resizing table 14, then at step 164 the simulator program 8 determines whether the target address which was transformed by the address space resizing table 14 is valid in the simulated address space 46. If the target address is invalid, then again this is not an artefact of the address space resizing table 14 but represents a fault with the simulated page tables used by the target program code and so again at step 162 a simulated exception may be signalled to the target program code.

However, if at step 164 it is determined that the target address was valid in the simulated address space, then this may indicate that while the target address is validly mapped in the simulated page tables, the address space resizing table 14 is currently mapping this to an invalid address in the host address space 48 because there are not enough valid host addresses to represent every possible address of the simulated address space 46. In this case, at step 166, the simulator program code determines whether there are any available addresses of the host address space which are available for mapping to valid addresses of the simulated address space. If so, then one of these available addresses is selected and at step 168 the selected addresses of the host address space are remapped to the addresses of the simulated address space which include the target address. Note that, as the address space resizing table may be implemented with entries corresponding to blocks of addresses, it may not only be the target address itself which is remapped, but also the other addresses of the block containing the target address may also be remapped.

If at step 166 it is determined that all the available addresses of the host address space 48 which can be mapped to valid addresses of the simulated address space 46 are exhausted, then at step 170 one or more victim addresses of the simulated address space are selected, for example based on the eviction policy information 56 stored in the address space resizing table (such as tags for tracking which entries were least recently used). Again, the victim addresses may correspond to a victim block of addresses at the granularity with which the address space resizing table entries are implemented. At step 172, the victim addresses are remapped to invalid addresses of the host address space, for example by using the reserved value(s) of the remapped address portion which cannot represent any valid address in the host address space 48, e.g. a predetermined value of all ones for example. Having remapped the victim addresses to invalid addresses, then at step 168 the target address (and any surrounding addresses of the same block) are remapped to the newly available addresses of the host address space which were previously mapped to the victim addresses of the simulated address space.

Regardless of the outcome of FIG. 8, having handled the MMU fault, the simulator code may pass a simulated exception back to the target code. If a simulated exception is generated, a number of responses could be taken by the target code. For example, the simulated operating system could allocate more memory to the program that was being run, and then return control to that program, which may then reattempt the memory access. Another option would be for the simulated operating system to load data from disk that corresponds to this memory location, and then return control to the program that caused the fault, which then reattempts the memory access. Another option is for the simulated operating system to terminate the program which caused the invalid address. Alternatively, instead of generating a simulated exception, the simulator code may simply generate another host memory access instruction with the newly remapped transformed address corresponding to the target address and then trigger the MMU 34 to repeat the translation lookup which this time should not generate a fault. With any of these options, the simulator code enables the target code to make forward progress.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method for controlling processing of target program code on a host data processing apparatus to simulate processing of the target program code on a target data processing apparatus; the method comprising:
in response to a target memory access instruction of the target program code specifying a target address within a simulated address space having a larger size than a host address space supported by a memory management unit of the host data processing apparatus:
looking up an address space resizing table to map the target address to a transformed address within said host address space; and
generating information for triggering a memory access based on translation of the transformed address by the memory management unit of the host data processing apparatus.

2. The method of claim 1, in which the address space resizing table maps an X-bit portion of the target address to a Y-bit portion of the transformed address, where X>Y.

3. The method of claim 2, in which the simulated address space comprises an M-bit address space, the host address space comprises an N-bit address space, where M>N;
the X-bit portion comprises a most significant portion of M bits of the target address used to represent addresses within the simulated address space; and
the Y-bit portion comprises a most significant portion of N bits of the transformed address used to represent addresses within the simulated address space.

4. The method of claim 2, in which a least significant portion of the transformed address equals a least significant portion of the target address.

5. The method of claim 1, in which the address space resizing table is stored in a region of the host address space reserved for simulation control information inaccessible to the target program code.

6. The method of claim 1, in which the address space resizing table maps at least one valid address in the simulated address space to an invalid address in the host address space.

7. The method of claim 6, comprising, in response to the memory management unit of the host data processing apparatus triggering a fault in response to the translation of the transformed address, determining whether the target address corresponds to a valid address in the simulated address space.

8. The method of claim 7, in which, when the target address corresponds to a valid address in the simulated address space, the address space resizing table is updated to remap one or more addresses of the simulated address space including the target address to valid addresses in the host address space.

9. The method of claim 8, in which, when the target address corresponds to a valid address in the simulated address space and available addresses of the host address space available for mapping to valid addresses of the simulated address space are exhausted, one or more victim addresses of the simulated address space previously mapped to valid addresses of the host address space are remapped to invalid addresses in the host address space.

10. The method of claim 9, wherein the one or more victim addresses are selected based on eviction policy information specified for associated blocks of addresses in the address space resizing table.

11. The method of claim 7, in which, when the target address corresponds to an invalid address in the simulated address space, a simulated exception is signalled to trigger updating of a simulated page table associated with the simulated address space.

12. The method of claim 1, in which at least one valid address mapped to a peripheral device in the simulated address space is mapped by the address space resizing table to an invalid address in the host address space.

13. The method of claim 12, comprising, in response to the memory management unit of the host data processing apparatus triggering a fault in response to the translation of the transformed address, determining whether the target address is mapped to the peripheral device in the simulated address space, and when the target address is mapped to the peripheral device, accessing peripheral simulation program logic for simulating a behaviour of the peripheral device.

14. The method of claim 1, comprising looking up an address space size indication indicative of whether a size of the simulated address space is greater than a size of the host address space; and in response to the target memory access instruction:
when the address space indication indicates that the simulated address space has the same size or a smaller size than the host address space, suppressing a lookup of the address space resizing table and generating information for triggering the memory access based on translation of the target address by the memory management unit of the host data processing apparatus; and
when the address space indication indicates that the simulated address space has a greater size than the host address space, looking up the address space resizing table and generating the information for triggering the memory access based on translation of the transformed address by the memory management unit of the host data processing apparatus.

15. The method of claim 1, in which the information for triggering the memory access comprises a host memory access instruction of an instruction set architecture supported by the host data processing apparatus, the host memory access instruction specifying the transformed address.

16. The method of claim 15, comprising executing the host memory access instruction in response to detection of the target memory access instruction.

17. The method of claim 15, comprising, in response to detection of the target memory access instruction, storing the host memory access instruction for later execution by the host data processing apparatus.

18. A non-transitory storage medium storing a computer program for controlling the host data processing apparatus to perform the method of claim 1.

19. A host data processing apparatus comprising:
processing circuitry; and
a non-transitory storage medium storing a computer program for controlling the processing circuitry to perform the method of claim 1.

20. A non-transitory storage medium storing a computer program for controlling processing of target program code on a host data processing apparatus to simulate processing of the target program code on a target data processing apparatus;
the computer program comprising:
instruction detection program logic to detect a target memory access instruction of the target program code specifying a target address within a simulated address space having a larger size than a host address space supported by a memory management unit of the host data processing apparatus; and
memory access control program logic responsive to detection of the target memory access instruction to look up an address space resizing table to map the target address to a transformed address within the host address space, and generate information for triggering a memory access based on translation of the transformed address by the memory management unit of the host data processing apparatus.

* * * * *